(12) United States Patent
Tenyama et al.

(10) Patent No.: US 11,795,094 B2
(45) Date of Patent: Oct. 24, 2023

(54) METHOD AND DEVICE FOR MANUFACTURING GLASS ARTICLE

(71) Applicant: Nippon Electric Glass Co., Ltd., Shiga (JP)

(72) Inventors: Kazuyuki Tenyama, Shiga (JP); Shusaku Tamamura, Shiga (JP); Shusuke Okamoto, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 335 days.

(21) Appl. No.: 16/761,001

(22) PCT Filed: Nov. 29, 2018

(86) PCT No.: PCT/JP2018/043962
§ 371 (c)(1),
(2) Date: May 1, 2020

(87) PCT Pub. No.: WO2019/124018
PCT Pub. Date: Jun. 27, 2019

(65) Prior Publication Data
US 2020/0299171 A1 Sep. 24, 2020

(30) Foreign Application Priority Data
Dec. 20, 2017 (JP) ................. 2017-244146

(51) Int. Cl.
*C03B 17/06* (2006.01)
*C03B 5/225* (2006.01)
(Continued)

(52) U.S. Cl.
CPC ............ *C03B 17/064* (2013.01); *C03B 5/225* (2013.01); *C03B 5/1675* (2013.01); *C03B 7/07* (2013.01); *C03B 25/08* (2013.01); *F27D 3/14* (2013.01)

(58) Field of Classification Search
None
See application file for complete search history.

(56) References Cited

U.S. PATENT DOCUMENTS

| | | | | |
|---|---|---|---|---|
| 1,986,396 A | * | 1/1935 | Handforth | ............... C01B 21/26 423/403 |
| 2,658,729 A | * | 11/1953 | Horwitz | .................... F23K 5/20 165/157 |

(Continued)

FOREIGN PATENT DOCUMENTS

| | | |
|---|---|---|
| CN | 103153884 | 6/2013 |
| CN | 203498245 | 3/2014 |

(Continued)

OTHER PUBLICATIONS

International Preliminary Report on Patentability and Written Opinion of the International Searching Authority dated Jun. 23, 2020 in International (PCT) Patent Application No. PCT/JP2018/043962.

(Continued)

*Primary Examiner* — Jodi C Franklin
(74) *Attorney, Agent, or Firm* — Wenderoth, Lind & Ponack, L.L.P.

(57) ABSTRACT

Provided is a manufacturing method for a glass article, including: a pre-heating step (S1) of heating a transfer pipe (7); and a transfer step (S4) of causing molten glass to flow through the transfer pipe (7) after the pre-heating step (S1). The transfer pipe (7) includes a main body portion (8) having a tubular shape and a flange portion (9a, 9b) formed on an end portion of the main body portion (8). The main body portion (8) is retained by a refractory (10). In the pre-heating step (S1), the main body portion (8) is heated while the flange portion (9a, 9b) is movably supported so that the flange portion (9a, 9b) is moved in accordance with extension of the main body portion (8).

19 Claims, 15 Drawing Sheets

(51) Int. Cl.
    *C03B 5/167*        (2006.01)
    *C03B 7/07*         (2006.01)
    *C03B 25/08*       (2006.01)
    *F27D 3/14*        (2006.01)

(56) References Cited

U.S. PATENT DOCUMENTS

| | | | | |
|---|---|---|---|---|
| 4,365,986 A * | 12/1982 | Nayak | ............ | C03B 5/26 65/327 |
| 4,565,562 A * | 1/1986 | Seng | ............ | C03B 3/023 65/335 |
| 4,697,274 A * | 9/1987 | Enkner | ............ | C03B 3/00 373/79 |
| 4,814,528 A * | 3/1989 | Schussler | ............ | C07C 17/38 570/262 |
| 4,816,228 A * | 3/1989 | Yoshida | ............ | C03B 5/43 219/649 |
| 5,002,600 A * | 3/1991 | Sorg | ............ | C03B 7/02 65/346 |
| 5,643,350 A * | 7/1997 | Mason | ............ | C03B 5/26 65/327 |
| 5,776,221 A * | 7/1998 | Dembicki | ............ | C03B 7/16 65/129 |
| 6,119,484 A * | 9/2000 | Takei | ............ | C03B 5/205 65/374.13 |
| 8,019,206 B2 * | 9/2011 | Hirabara | ............ | C03B 5/2252 392/314 |
| 10,633,274 B2 * | 4/2020 | De Angelis | ............ | C03B 5/02 |
| 10,633,276 B2 * | 4/2020 | De Angelis | ............ | C03B 7/06 |
| 11,021,386 B2 * | 6/2021 | Barnett | ............ | C03B 7/07 |
| 11,242,275 B2 * | 2/2022 | Kocatulum | ............ | C03B 17/064 |
| 11,370,684 B2 * | 6/2022 | Tamamura | ............ | F27D 3/14 |
| 2002/0190444 A1 * | 12/2002 | Kagan | ............ | H02K 44/04 266/237 |
| 2008/0087046 A1 * | 4/2008 | Hirabara | ............ | C03B 5/2252 219/67 |
| 2008/0092597 A1 * | 4/2008 | Itoh | ............ | C03B 5/26 392/314 |
| 2009/0217709 A1 * | 9/2009 | Adelsberg | ............ | C03B 5/027 65/355 |
| 2010/0218558 A1 * | 9/2010 | Gross | ............ | C03B 5/03 65/135.6 |
| 2011/0019712 A1 * | 1/2011 | Geib | ............ | F27D 21/00 373/27 |
| 2011/0203321 A1 * | 8/2011 | De Angelis | ............ | C03B 5/167 65/45 |
| 2011/0204039 A1 * | 8/2011 | De Angelis | ............ | C03B 7/07 219/438 |
| 2012/0125051 A1 * | 5/2012 | Bergman | ............ | C03B 7/02 65/324 |
| 2012/0275483 A1 * | 11/2012 | De Angelis | ............ | C03B 5/1672 373/41 |
| 2013/0333420 A1 * | 12/2013 | Goller | ............ | C03B 5/1675 65/135.1 |
| 2014/0013806 A1 * | 1/2014 | De Angelis | ............ | C03B 7/098 65/135.1 |
| 2014/0144183 A1 * | 5/2014 | Demirbas | ............ | C03B 5/1675 65/374.13 |
| 2017/0283294 A1 * | 10/2017 | Delia | ............ | C03B 5/1675 |
| 2018/0072602 A1 * | 3/2018 | De Angelis | ............ | C03B 5/033 |
| 2018/0297882 A1 * | 10/2018 | De Angelis | ............ | C03B 5/44 |
| 2018/0297883 A1 * | 10/2018 | De Angelis | ............ | C03B 7/06 |
| 2019/0161375 A1 * | 5/2019 | Okamoto | ............ | C03B 5/262 |
| 2020/0095152 A1 * | 3/2020 | Kocatulum | ............ | C03B 7/088 |
| 2020/0199005 A1 * | 6/2020 | Tenyama | ............ | C03B 5/43 |
| 2020/0299171 A1 * | 9/2020 | Tenyama | ............ | C03B 17/064 |
| 2020/0354251 A1 * | 11/2020 | Itazu | ............ | C03B 7/02 |
| 2021/0147275 A1 * | 5/2021 | Tamamura | ............ | C03B 5/235 |
| 2021/0347668 A1 * | 11/2021 | De Angelis | ............ | C03B 5/225 |
| 2021/0371318 A1 * | 12/2021 | De Angelis | ............ | C03B 7/07 |
| 2022/0073398 A1 * | 3/2022 | De Angelis | ............ | C03B 7/08 |

FOREIGN PATENT DOCUMENTS

| | | |
|---|---|---|
| JP | 2-180720 | 7/1990 |
| JP | 2013-216535 | 10/2013 |
| JP | 2014-9125 | 1/2014 |

OTHER PUBLICATIONS

Office Action dated Jan. 4, 2022 in corresponding Chinese Patent Application No. 201880070570.4, with English translation.
International Search Report dated Mar. 5, 2019 in International (PCT) Application No. PCT/JP2018/043962.

* cited by examiner

METHOD AND DEVICE FOR MANUFACTURING GLASS ARTICLE

TECHNICAL FIELD

The present invention relates to a method and an apparatus for manufacturing a glass article such as a sheet glass.

BACKGROUND ART

As is well known, flat panel displays such as liquid crystal displays and OLED displays have been reduced in thickness and weight. Along with such reduction in thickness and weight, further reduction in thickness of a sheet glass to be used for the flat panel displays is also required.

In general, as a method for manufacturing a sheet glass to be used for flat panel displays, various forming methods such as an overflow down-draw method are used. For example, the sheet glass is formed into a thin sheet through various steps such as a melting step, a fining step, a homogenizing step, and a forming step. In Patent Literature 1, there is disclosed a manufacturing apparatus configured to perform the steps described above, which includes a melting furnace, a fining bath, a stirring bath, a forming device, and transfer pipes (glass supply pipes) configured to connect these constituents to each other and transfer a molten glass.

The molten glass to be transferred through the transfer pipes becomes higher in temperature. Therefore, in order to enable the transfer of the molten glass, it is required that the transfer pipes be pre-heated in advance before operation of the sheet glass manufacturing apparatus (hereinafter, this step is referred to as "pre-heating step"). In the pre-heating step, when heating is performed under a state in which the transfer pipes are coupled to each other or in which the transfer pipes and other constituents such as the fining bath are coupled, the coupling portions may be deformed due to thermal expansion (hereinafter simply referred to as "expansion"), with the result that the transfer pipes may be damaged. Therefore, in Patent Literature 1, there is disclosed a method of assembling the manufacturing apparatus after performing the pre-heating step under a state in which the transfer pipes and other constituents are separated.

CITATION LIST

Patent Literature

Patent Literature 1: JP 2013-216535 A

SUMMARY OF INVENTION

Technical Problem

However, with the pre-heating step in the related art, in some cases, the expansion of the transfer pipe cannot be sufficiently secured due to differences in various conditions such as a supporting structure, a heating temperature, and a heating time for the transfer pipe. When the expansion of the transfer pipe in the pre-heating step is insufficient, thermal stress is generated in the transfer pipe. In this case, in the manufacture of the glass article after assembly of the manufacturing apparatus, the transfer pipe is further expanded. Therefore, the thermal stress in the transfer pipes is increased, and there is a risk of causing damage.

The present invention has been made in view of the circumstances described above, and has an object to provide a manufacturing method and a manufacturing apparatus for a glass article, which is capable of sufficiently expanding a transfer pipe in a pre-heating step.

The present invention has been made to solve the problem described above, and provides a manufacturing method for a glass article, comprising: a pre-heating step of heating a transfer pipe; and a transfer step of causing molten glass to flow through the transfer pipe after the pre-heating step, wherein the transfer pipe comprises a main body portion having a tubular shape and a flange portion formed on an end portion of the main body portion, wherein the main body portion is retained by a refractory, and wherein, in the pre-heating step, the main body portion is heated while the flange portion is movably supported so that the flange portion is moved in accordance with extension of the main body portion.

According to such a configuration, in the pre-heating step, the main body portion is heated while the flange portion of the transfer pipe is supported. Thus, the flange portion being a heavy object acts like a weight so that expansion (extension) of the main body portion can be prevented from being hindered. Further, the flange portion is movably supported. Thus, frictional resistance generated when the flange portion moves in accordance with expansion of the main body portion can be reduced as much as possible. Accordingly, thermal stress generated in the transfer pipe can be reduced, and the transfer pipe can be expanded sufficiently. Therefore, also in the manufacture of the glass article after the pre-heating step, the thermal stress in the transfer pipe can be reduced, and deformation or buckling of the transfer pipe caused by the expansion can be prevented, thereby being capable of achieving a long lifetime.

It is desired that, in the pre-heating step, an electric wire connected to the transfer pipe be movably supported so that the electric wire is moved in accordance with the extension of the main body portion. With this, when the main body portion is expanded, the electric wire is prevented from hindering the expansion. Therefore, thermal stress generated in the transfer pipe can be further reduced in the pre-heating step, and the thermal stress in the transfer pipe can be further reduced also in manufacture of a glass article after the pre-heating step.

It is preferred that, in the pre-heating step, an upper portion of the flange portion be movably supported. In addition, in the pre-heating step, a configuration, in which an intermediate portion of the flange portion in an up-and-down direction is movably supported, can be adopted. In the pre-heating step, a lower portion of the flange portion may be movably supported.

In the pre-heating step, it is preferred that the flange portion be movably supported by a rolling member. With this, the rolling member rolls when the flange portion moves so that frictional resistance at the time of expansion of the main body portion can be reduced as much as possible.

In the pre-heating step, a configuration, in which the flange portion is movably supported by a rod-shaped coupling member having an upper end swingably retained and a lower end swingably coupled to the flange portion, may be adopted.

The present invention has been made to solve the problem described above, and provides a manufacturing device for a glass article, comprising: a transfer pipe configured to cause molten glass to flow therethrough; and a refractory configured to retain the transfer pipe, wherein the transfer pipe comprises a main body portion having a tubular shape and a flange portion formed on an end portion of the main body portion, wherein the main body portion is retained by the refractory, and wherein the manufacturing device further comprises a support device configured to support the flange portion under a state in which the flange portion is movable in accordance with extension of the main body portion.

According to such a configuration, in the pre-heating step, the main body portion is heated while the flange portion of the transfer pipe is supported. Thus, the flange portion being a heavy object acts like a weight so that expansion (extension) of the main body portion can be prevented from being hindered. Further, the flange portion is movably supported. Thus, frictional resistance generated when the flange portion moves in accordance with expansion of the main body portion can be reduced as much as possible. Accordingly, thermal stress generated in the transfer pipe can be reduced, and the transfer pipe can be expanded sufficiently. Therefore, also in the manufacture of the glass article after the pre-heating step, the thermal stress in the transfer pipe can be reduced, and deformation or buckling of the transfer pipe caused by the expansion can be prevented, thereby being capable of achieving a long lifetime.

Advantageous Effects of Invention

According to the present invention, the transfer pipe can be sufficiently expanded in the pre-heating step.

DESCRIPTION OF EMBODIMENTS

Embodiments of the present invention are described below with reference to the drawings. A manufacturing method and manufacturing apparatus for a glass article according to an embodiment (first embodiment) of the present invention are illustrated in FIG. 1 to FIG. 6.

Figure 1:
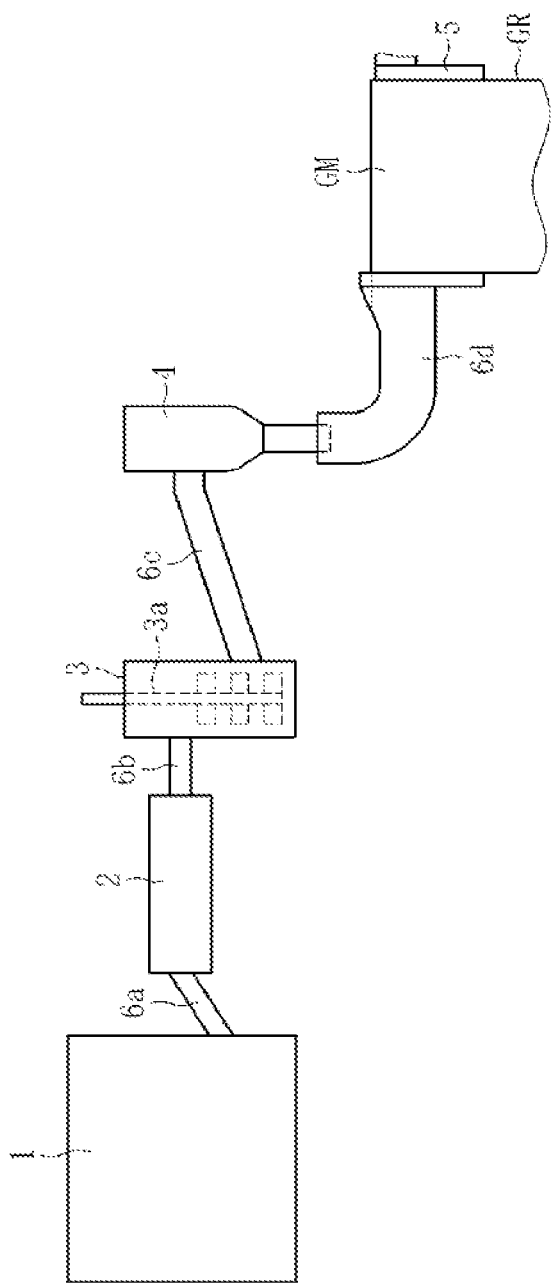
FIG. 1 is a side view for illustrating an overall configuration of a manufacturing device for a glass article according to a first embodiment.

As illustrated in FIG. 1, a manufacturing apparatus for a glass article according to this embodiment comprises: a melting bath 1; a fining bath 2; a homogenization bath (stirring bath) 3; a pot 4; a forming body 5; and glass supply passages 6a to 6d configured to connect these constituents 1 to 5 in the stated order from an upstream side. In addition thereto, the manufacturing apparatus further comprises: an annealing furnace (not shown) configured to anneal a sheet glass GR (glass article) formed by the forming body 5; and a cutting device (not shown) configured to cut the sheet glass GR after the annealing.

The melting bath 1 is a container for performing a melting step of melting loaded glass raw materials to obtain a molten glass GM. The melting bath 1 is connected to the fining bath 2 through the glass supply passage 6a.

The fining bath 2 is a container for performing a fining step of, while transferring the molten glass GM, degassing the molten glass GM through the action of a fining agent or the like. The fining bath 2 is connected to the homogenization bath 3 through the glass supply passage 6b. The fining bath 2 of this embodiment is formed of the transfer pipe made of a platinum material (platinum or a platinum alloy).

The homogenization bath 3 is a container made of a platinum material for performing a step (homogenization step) of stirring the molten glass GM having been fined to homogenize the molten glass GM. The homogenization bath 3 comprises a stirrer 3a having a stirring blade. The homogenization bath 3 is connected to the pot 4 through the glass supply passage 6c.

The pot 4 is a container for performing a state adjustment step of adjusting the state of the molten glass GM so as to be suitable for forming. The pot 4 is presented as an example of a volume part configured to adjust the viscosity and flow rate of the molten glass GM. The pot 4 is connected to the forming body 5 through the glass supply passage 6d.

The forming body 5 is configured to form the molten glass GM into a preferred shape (for example, a sheet shape). In this embodiment, the forming body 5 is configured to form the molten glass GM into a sheet shape by an overflow down-draw method. Specifically, the forming body 5 has a substantially wedge shape in a sectional shape (sectional shape perpendicular to the drawing sheet of FIG. 1), and has an overflow groove (not shown) formed on an upper portion thereof.

The forming body 5 is configured to cause the molten glass GM to overflow from the overflow groove to flow down along both side wall surfaces (side surfaces located on a front surface side and a back surface side of the drawing sheet) of the forming body 5. The forming body 5 is configured to cause the molten glasses GM having flowed down to join each other at lower end portions of the side wall surfaces. With this, the band-shaped sheet glass GR is formed. Further, the forming body 5 may be used for performing any other down-draw method such as a slot down-draw method.

The band-shaped sheet glass GR obtained in such a manner is cut so that sheet glasses having a sheet shape are cut out. The sheet glass obtained as described above has a thickness of, for example, from 0.01 mm to 2 mm, and is utilized for a flat panel display, such as a liquid crystal display or an OLED display, a substrate of an OLED illumination or a solar cell, or a protective cover. A glass article according to the present invention is not limited to the sheet glass, and encompasses a glass pipe and other glass articles having various shapes. For example, when a glass pipe is to be formed, a forming device utilizing a Danner method is arranged in place of the forming body 5.

As a material of the sheet glass, silicate glass or silica glass is used, borosilicate glass, soda lime glass, alumino-silicate glass, or chemically strengthened glass is preferably used, and alkali-free glass is most preferably used. The "alkali-free glass" as used herein refers to glass substantially free of an alkaline component (alkali metal oxide), and specifically refers to glass having a weight ratio of an alkaline component of 3,000 ppm or less. In the present invention, the weight ratio of the alkaline component is preferably 1,000 ppm or less, more preferably 500 ppm or less, most preferably 300 ppm or less.

Figure 2:
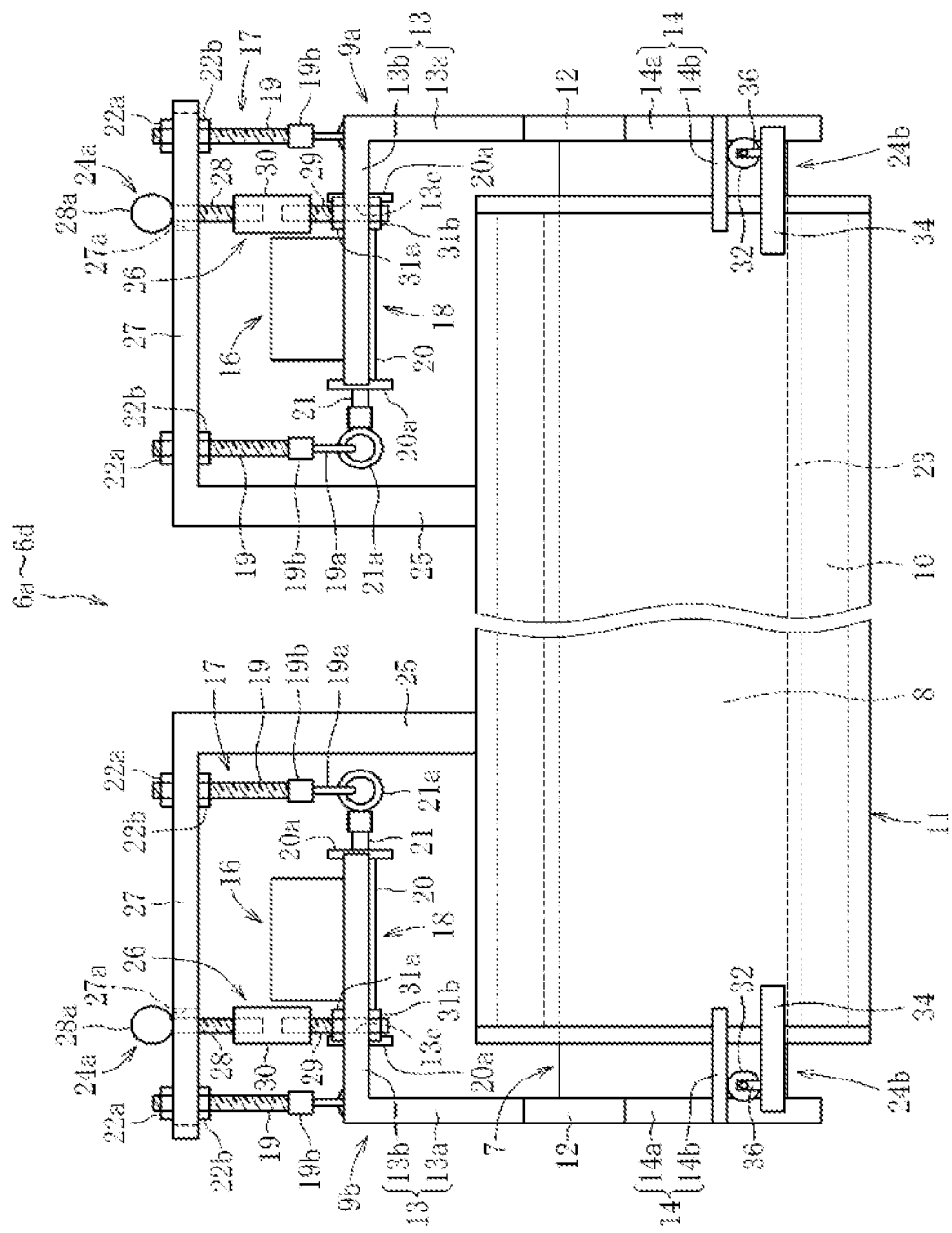
FIG. 2 is a side view of a transfer pipe.

The glass supply passages 6a to 6d are each formed of a transfer pipe 7. As illustrated in FIG. 2, the transfer pipe 7 comprises a main body portion 8 and flange portions 9a and 9b. The main body portion 8 has an elongated shape and is configured to transfer the molten glass GM. The flange portions 9a and 9b are provided at end portions of the main body portion 8, respectively. The main body portion 8 is retained by a refractory 10, and the refractory 10 is fixed to a casing 11.

The main body portion 8 is made of a platinum material (platinum or a platinum alloy) and has a tubular shape (for example, cylindrical shape). The main body portion 8 is formed so as to be longer than the refractory 10. Therefore, the end portions of the main body portion 8 project in a longitudinal direction from end portions of the refractory 10.

The flange portions 9a and 9b each have a plate shape. The flange portions 9a and 9b comprise a first flange portion 9a provided at one end portion of the main body portion 8 and a second flange portion 9b provided at another end portion of the main body portion 8. The flange portions 9a and 9b are formed so as to surround outer peripheral surfaces at the end portions of the main body portion 8, respectively.

Figure 3:
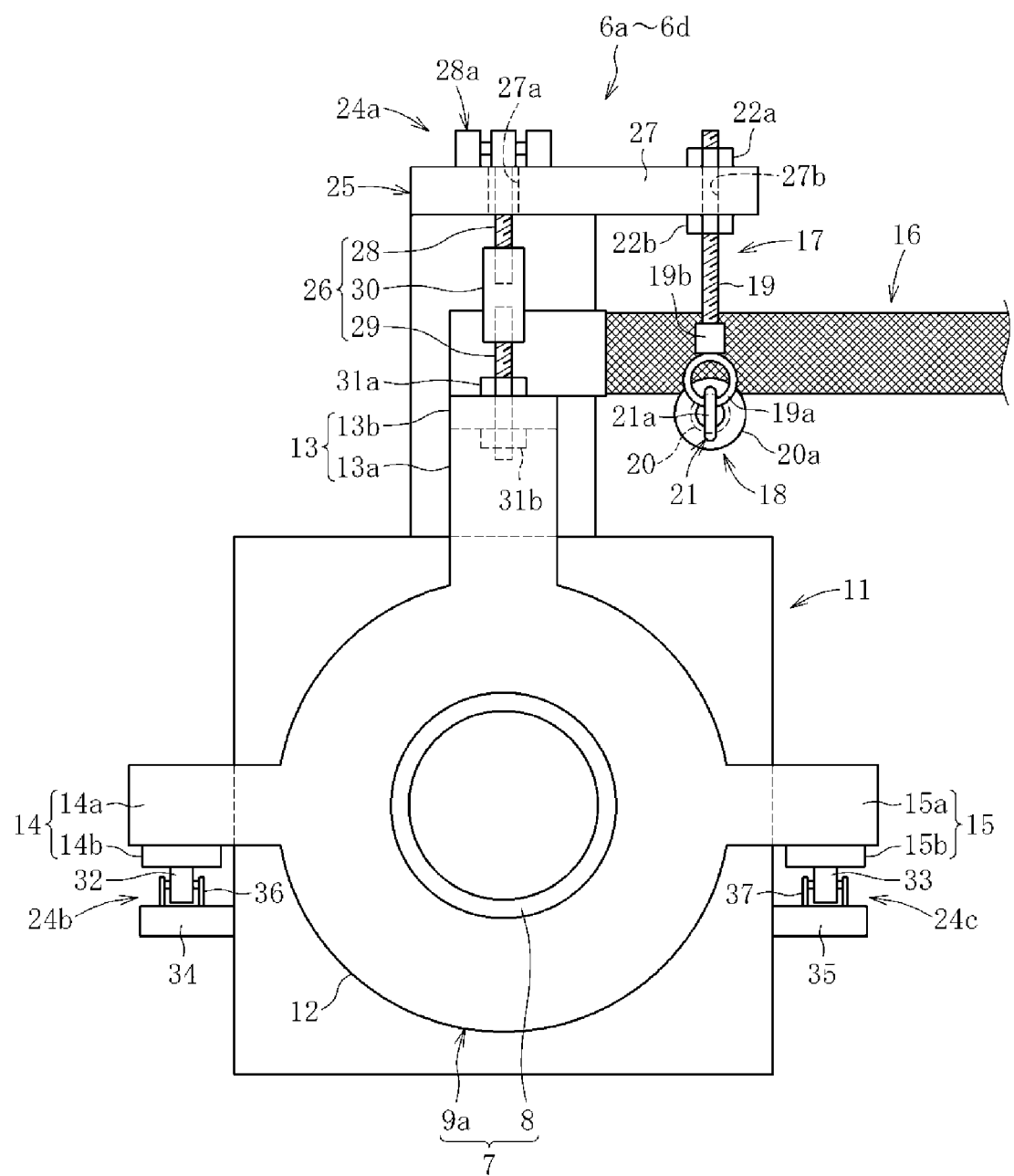
FIG. 3 is a front view of the transfer pipe.

As illustrated in FIG. 2 and FIG. 3, the flange portions 9a and 9b each comprise a disc portion 12 and a plurality of projecting portions 13 to 15 projecting from the disc portion 12. The disc portions 12 are fixed at the end portions of the main body portion 8 in the longitudinal direction and are each made of the platinum material. The projecting portions 13 to 15 comprise a first projecting portion 13, a second projecting portion 14, and a third projecting portion 15. The first projecting portion 13 projects upward from an upper portion of the disc portion 12. The second projecting portion 14 and the third projecting portion 15 project sideward from side portions of the disc portion 12.

The first projecting portions 13 serve as electrode portions (terminals) configured to cause a current to flow through the main body portion 8 via the flange portions 9a and 9b. By applying a predetermined voltage to the first projecting portions 13, the main body portion 8 is directly energized and heated. Therefore, the first projecting portions 13 are made of, for example, copper (including a copper alloy) or nickel (including a nickel alloy).

The first projecting portions 13 comprise first portions 13a, which are formed integrally with the flange portions 9a and 9b, and second portions 13b, which are formed integrally with end portions of the first portions 13a. The first portions 13a are rectangular plate portions projecting upward from upper portions of the flange portions 9a and 9b. The second portions 13b are rectangular plate portions being continuous with the first portions 13a at the right angle. The second portions 13b project from upper end portions of the first portions 13a in a substantially horizontal direction or along the longitudinal direction of the main body portion 8. The second portions 13b each have a hole 13c passing through the corresponding one of the second portions 13b in an up-and-down direction.

An electric wire 16 is connected to the second portion 13b through intermediation of a connector. The electric wire 16 is formed of a braided wire, and is covered with an insulating material. The electric wire 16 extends in a direction intersecting with a longitudinal direction of the transfer pipe 7.

Figure 4:
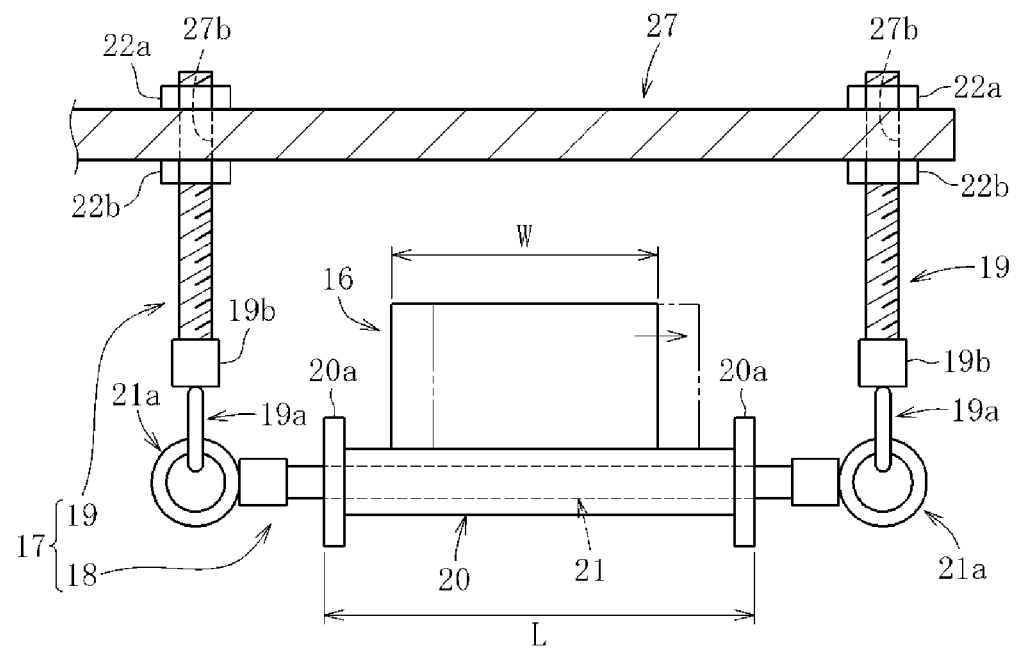
FIG. 4 is aside view for illustrating a supporting structure for an electric wire.

The electric wire 16 is supported so as to be movable in the longitudinal direction of the transfer pipe 7 by a support member 17. As illustrated in FIG. 2 to FIG. 4, the support member 17 comprises a first support body 18 and second support bodies 19. The first support body 18 is configured to support a lower portion of the electric wire 16. The second support bodies 19 are configured to support an end portion of the first support body 18.

The first support body 18 comprises a roller 20 and a shaft portion 21 configured to support the roller 20 so as to be rotatable. The roller 20 is a rolling element formed into a cylindrical shape. A length L of the roller 20 is set larger than a width W of the electric wire 16. With this, the roller 20 is configured to support the electric wire 16 so as to allow movement of the electric wire 16 in a certain range when the electric wire 16 moves (slides) in the longitudinal direction of the main body portion 8 of the transfer pipe 7. Flange portions 20a are formed on both end portions of the roller 20. The shaft portion 21 is inserted through the roller 20. The shaft portion 21 comprises an annular coupling portion 21a coupled to the second support body 19. The annular coupling portion 21a is formed into an annular shape.

The second support bodies 19 are formed of, for example, a pair of long screws (threaded rods). However, the second support bodies 19 are not limited thereto, and may be formed of other various support members. Upper end portions of the second support bodies 19 are supported on the casing 11 through intermediation of fixing members 22a and 22b. The fixing members 22a and 22b are formed of a pair of nuts. Lower end portions of the second support bodies 19 each comprise an annular coupling portion 19a coupled to the first support body 18. The annular coupling portion 19a is formed into an annular shape, and is coupled to the annular coupling portion 21a of the shaft portion 21 of the first support body 18. An insulating material 19b is interposed between the long screw of the second support body 19 and the annular coupling portion 19a.

The second projecting portion 14 of each of the flange portions 9a and 9b comprises a first portion 14a and a second portion 14b. The first portion 14a projects sideways from the disc portion 12. The second portion 14b projects from an end portion of the first portion 14a toward a center portion of the transfer pipe 7 in the longitudinal direction. The second projecting portion 14 may be made of steel, or may be made of copper or nickel similarly to the first projecting portion 13.

The third projecting portion 15 of each of the flange portions 9a and 9b comprises a first portion 15a and a second portion 15b. The first portion 15a projects in a direction opposite to the first portion 14a of the second projecting portion 14. The second portion 15b projects from an end portion of the first portion 15a toward the center portion of the transfer pipe 7 in the longitudinal direction. The third projecting portion 15 may be made of steel, or may be made of copper or nickel similarly to the first projecting portion 13.

The first portions 14a and 15a of the second projecting portion 14 and the third projecting portion 15 are each formed into an elongated plate shape. The first portion 14a of the second projecting portion 14 projects outward in the radial direction from one side portion (intermediate portion in the up-and-down direction) of the disc portion 12. The first portion 15a of the third projecting portion 15 projects from another side portion of the disc portion 12 (intermediate portion in the up-and-down direction) in a direction opposite to the second projecting portion 14. The first portions 14a and 15a of the second projecting portion 14 and the third projecting portion 15 each have a length projecting from a side surface of the casing 11.

The second portions 14b and 15b of the second projecting portion 14 and the third projecting portion 15 are fixed to end portions of the first portions 14a and 15a, which project from the casing 11, in the longitudinal direction, respectively. The second portions 14b and 15b are each formed into a plate shape, and are fixed to lower portions of end portions of the second projecting portion 14 and the third projecting portion 15, respectively, in a posture of being parallel to the main body portion 8 of the transfer pipe 7.

The refractory 10 (for example, a refractory brick) is made of a highly zirconia-based refractory, but the material is not limited thereto. The casing 11 is formed as a rectangular parallelepiped body or a cylindrical body made of steel or other metal, but the shape thereof is not limited thereto. The casing 11 is supported so that a position thereof is changeable by a carrier or the like (not shown) in a building such as a factory in which the manufacturing apparatus for a glass article is arranged.

A supporting material 23 configured to support the transfer pipe 7 is interposed between the refractory 10 and the main body portion 8. The supporting material 23 of this embodiment is a bonded body which is obtained by filling powder serving as a raw material between the main body portion 8 of the transfer pipe 7 and the refractory 10, and then diffusion-bonding the powder through heating. The "diffusion-bonding" refers to a method involving bringing the powder particles into contact with each other to bond the powder particles to each other through utilization of diffusion of atoms occurring between contact surfaces.

For example, a mixture of alumina powder and silica powder may be used as the powder to be the raw material of the supporting material 23. In this case, the mixture desirably contains alumina powder having a high melting point as a main component. The configuration of the supporting material 23 is not limited to the configuration described above, in addition to alumina powder and silica powder, other various material powders such as zirconia powder and yttria powder may be used independently. Alternatively, the supporting material 23 may be configured by mixing a plurality of kinds of powders. The supporting material 23 may be formed of a refractory fiber layer, which is held in contact with an outer peripheral surface of the main body portion 8 of the transfer pipe 7, and an unformed refractory layer, which is arranged on an outer side of the refractory fiber layer.

The projecting portions 13 to 15 of each of the flange portions 9a and 9b are supported by support devices 24a to 24c, respectively, so as to be movable in the longitudinal direction of the transfer pipe 7. The support devices 24a to 24c comprise a first support device 24a, a second support device 24b, and a third support device 24c. The first support device 24a is configured to support the first projecting portion 13 of each of the flange portions 9a and 9b of the transfer pipe 7. The second support device 24b is configured to support the second projecting portion 14 of each of the flange portions 9a and 9b of the transfer pipe 7. The third support device 24c is configured to support the third projecting portion 15 of each of the flange portions 9a and 9b of the transfer pipe 7.

The first support device 24a comprises a support column 25 and a rod-shaped coupling member 26. The support column 25 is fixed to the casing 11. The coupling member 26 connects the support column 25 and the first projecting portion 13 to each other.

The support column 25 is made of steel or other metal and has an elongated shape. The support column 25 has one end portion (lower end portion) fixed to the outer surface of the casing 11 by a method such as welding. The support column 25 projects upward from an upper portion of the casing 11.

The support column 25 comprises a support portion 27 to which one end portion of the coupling member 26 is coupled. The support portion 27 projects from an upper end portion of the support column 25 along a horizontal direction or a longitudinal direction of the casing 11 (cylinder center direction). The support portion 27 has a hole (hereinafter referred to as "long hole") 27a formed to be elongated along a projecting direction thereof. The long hole 27a is formed so as to pass through the support portion 27 in the up-and-down direction. Apart of each coupling member 26 is inserted through the long hole 27a. In addition, the support portion 27 has holes 27b through which the second support bodies 19 configured to support the electric wire 16 can be inserted. End portions of the second support bodies 19 are inserted through the holes 27b, and the support portion 27 is fastened so as to be sandwiched by the fixing members 22a and 22b configured to be threadedly engaged with the second support bodies 19 so that the second support bodies 19 are fixed to the support portion 27.

The coupling member 26 comprises a first rod 28, a second rod 29, and an insulating member 30. The first rod 28 is coupled to the supporting portion 27. The second rod 29 is coupled to a corresponding one of the flange portions 9a and 9b. The insulating member 30 is provided at a midway portion of a corresponding one of the coupling member 26. The first rod 28 is supported by the supporting portion 27. The second rod 29 is fixed to the first projecting portion 13 of a corresponding one of the flange portions 9a and 9b by fixing members 31a and 31b.

The first rod 28 is formed of a screw member made of metal. One end portion of the first rod 28 (upper end portion) may be fixed to the support portion 27. Another end portion of the first rod 28 is fastened into a female thread portion of the insulating member 30.

A roller 28a, which is configured to travel (roll) on an upper surface of the support portion 27, is rotatably provided to an upper end portion of the first rod 28. The roller 28a is a rolling member configured to follow movement of the first rod 28 that is caused in accordance with expansion of the main body portion 8 of the transfer pipe 7 when the main body portion 8 expands by heating. The roller 28a is held in contact with the upper surface of the support portion 27.

The second rod 29 is formed of a screw member made of metal, similarly to the first rod 28. One end portion (upper end portion) of the second rod 29 is fastened to a female thread portion of the insulating member 30. Another end portion (lower end portion) of the second rod 29 is inserted through a hole 13c formed through the second portion 13b of the first projecting portion 13 of a corresponding one of the flange portions 9a and 9b, and is fixed to the second portion 13b by the fixing members 31a and 31b.

The fixing members 31a and 31b are formed of a pair of nuts. The fixing members 31a and 31b are threadedly engaged with the second rod 29. Under a state in which a part of the second rod 29 is inserted through the hole 13c formed in the second portion 13b of the first projecting portion 13, the fixing members 31a and 31b are fastened so as to sandwich the second portion 13b of the first projecting portion 13, thereby fixing the second rod 29 to the second portions 13b.

An insulator is suitably used as the insulating member 30. Besides the insulator, a member which is made of a synthetic rubber or any other various materials and has a rectangular parallelepiped shape or a circular column shape may be used. The insulating member 30 couples the first rod 28 and the second rod 29 to each other under a state in which the lower end portion of the first rod 28 and the upper end portion of the second rod 29 are separated apart from each other without contact therebetween. As described above, the insulating member 30 is interposed between a corresponding one of the supporting member 27 and the first projecting portion 13 under a state in which the corresponding one of the supporting member 27 of the support column 25 and the first projecting portion 13 are connected to each other by the first rod 28 and the second rod 29.

The second support device 24b and the third support device 24c comprise rollers 32 and 33 serving as rolling members, and support bases 34 and 35 configured to rotatably support the rollers 32 and 33, respectively. An outer surface of each of the rollers 32 and 33 is formed of an insulating material. The rollers 32 and 33 are held in contact with lower surfaces of the second portions 14b and 15b of the second projecting portion 14 and the third projecting portion 15 of each of the flange portions 9a and 9b, respectively.

The support bases 34 and 35 are configured to rotatably support the rollers 32 and 33 through intermediation of brackets 36 and 37, respectively. The support bases 34 and 35 in this embodiment are fixed to an outer surface (side surfaces) of the casing 11, but are not limited thereto. For example, the support bases 34 and 35 may be arranged on a floor surface of a factory or the like on which the manufacturing device is installed, and may be supported by both of the outer surface of the casing 11 and a floor surface of a factory or the like. In view of improving workability in an assembling step S2 described later, it is preferred that the support bases 34 and 35 be fixed to the outer surface (side surfaces) of the casing 11.

Figure 5:
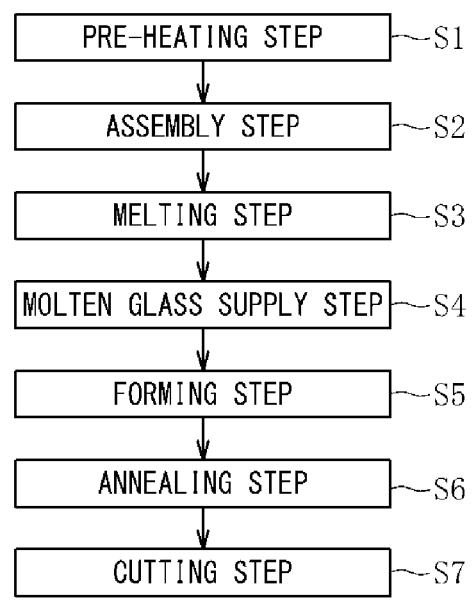
FIG. 5 is a flowchart of a manufacturing method for a glass article.
Figure 6:
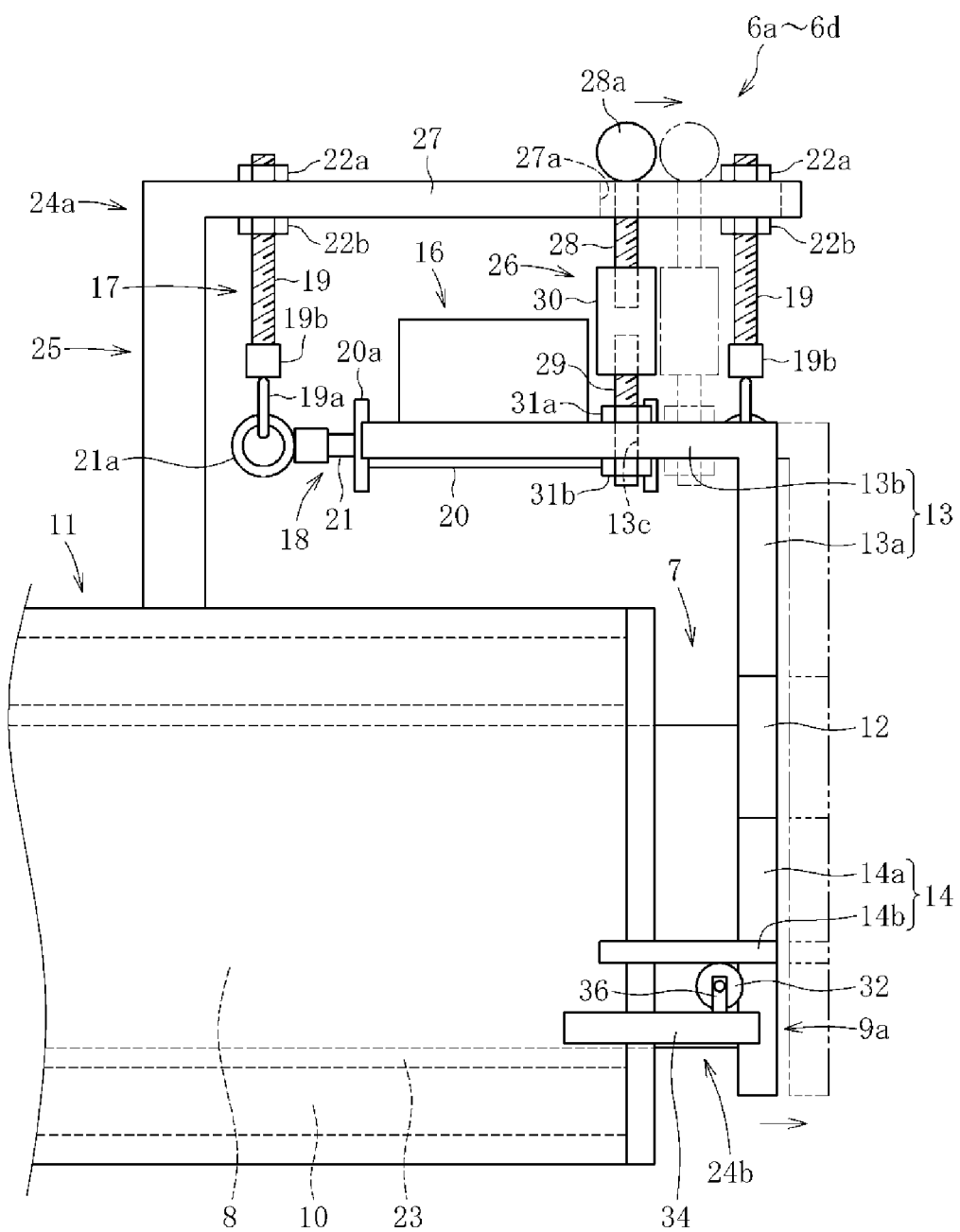
FIG. 6 is a side view for illustrating a part of the transfer pipe in a pre-heating step.

Now, a method of manufacturing a glass article (sheet glass) through use of the manufacturing apparatus having the configuration described above is described. As illustrated in FIG. 5, this method mainly comprises a pre-heating step S1, an assembly step S2, a melting step S3, a molten glass supply step S4, a forming step S5, an annealing step S6, and a cutting step S7.

In the pre-heating step S1, the constituents 1 to 5 and 6a to 6d of the manufacturing apparatus are increased in temperature under the state in which the constituents 1 to 5 and 6a to 6d are individually separated. In the following, as an example of the pre-heating step S1, description is made of a case in which the transfer pipe 7 constituting each of the glass supply passages 6a to 6d are increased in temperature.

In the pre-heating step S1, in order that the main body portion 8 of the transfer pipe 7 may be increased in temperature, a current is caused to flow through the main body portion 8 via the flange portions 9a and 9b. Through this heating, as indicated by the two-dot chain lines in FIG. 6, the main body portion 8 of the transfer pipe 7 expands in the longitudinal direction (axis direction) thereof. Moreover, the main body portion 8 and the flange portions 9a and 9b expand in a radial direction.

At this time, the supporting material 23 filled between the refractory 10 and the main body portion 8 in the casing 11 maintains a powder state, and can flow (move) in a space defined between the main body portion 8 and the refractory 10. As described above, the powder serving as the support material 23 acts as a lubricating material. Thus, a frictional force between the main body portion 8 and the support material 23 is reduced as much as possible so that expansion of the main body portion 8 is suitably promoted.

Moreover, the flange portions 9a and 9b are displaced in the longitudinal direction of the main body portion 8 in response to the expansion of the main body portion 8. At this time, the coupling members 26 of the first support device 24a coupled to the flange portions 9a and 9b are capable of following the displacement of the flange portions 9a and 9b with the rollers 28a rolling on the upper surfaces of the supporting portions 27 of the support column 25 (see the solid lines and the two-dot chain lines in FIG. 6).

Similarly, the second portions 14b and 15b of the second projecting portion 14 and the third projecting portion 15 of each of the flange portions 9a and 9b move in a direction in which the transfer pipe 7 extends under a state in which the second portions 14b and 15b are held in contact with the rollers 32 and 33 of the second support device 24b and the third support device 24c, respectively. At this time, with rotation of the rollers 32 and 33, the second portions 14b and 15b can move without being subjected to excessive resistance. Therefore, the support devices 24a to 24c can suitably support each of the flange portions 9a and 9b without hindering extension of the transfer pipe 7 (main body portion 8).

When the main body portion 8 reaches a predetermined temperature, and the main body portion 8 expands to a desired length, the pre-heating step S1 is terminated, and the assembling step S2 is executed. In the assembly step S2, the constituents 1 to 5 and 6a to 6d of the manufacturing apparatus, which have been heated and expanded, are coupled to one another so that the manufacturing apparatus is assembled.

In the melting step S3, the glass raw materials supplied to the melting bath 1 are heated to generate the molten glass GM. In order to shorten a start-up time of the manufacturing apparatus, the molten glass GM may be generated in the melting bath 1 in advance during or before the assembly step S2.

In the molten glass supply step S4, the molten glass GM in the melting bath 1 is sequentially transferred to the fining bath 2, the homogenization bath 3, the pot 4, and the forming body 5 through the glass supply passages 6a to 6d. In molten glass supply step S4, when the molten glass GM flows through the fining bath 2, gas (bubbles) is generated from the molten glass GM by an action of the fining agent blended in the glass raw material. This gas is discharged to the outside from the fining bath 2 (fining step). Moreover, in the homogenization bath 3, the molten glass GM is stirred and homogenized (homogenizing step). When the molten glass GM flows through the pot 4 and the glass supply passage 6d, a state of the molten glass GM (for example, viscosity and flow rate) is adjusted (state adjustment step).

In the molten glass supply step S4, when the temperature of powder interposed between the refractory 10 and the main body portion 8 becomes higher, the diffusion-bonding of the powder is activated. It is only required that the heating temperature for the powder be equal to or higher than a temperature that activates the diffusion-bonding of the powder, and it is preferred that the heating temperature be 1,400° C. or higher and 1,650° C. or lower.

In this embodiment, the diffusion-bonding occurs between the alumina powders in the powder and between the alumina powder and the silica powder in the powder. In addition, mullite is generated from the alumina powder and the silica powder. The mullite strongly bonds the alumina powders to each other. The diffusion-bonding proceeds with time, and finally, the powder becomes one or a plurality of bonded bodies (supporting material 23). The supporting material 23 adheres to the main body portion 8 and the refractory 10, which hinders the movement of the main body portion 8 relative to the refractory 10 in the molten glass supply step S4. With this, the main body portion 8 is fixed to the refractory 10 so as to prevent positional displacement. The supporting material 23 keeps supporting the main body portion 8 together with the refractory 10 until the manufacture of the sheet glass GR is terminated.

In the forming step S5, the molten glass GM is supplied to the forming body 5 after the molten glass supply step S4. The forming body 5 is configured to cause the molten glass GM to overflow from the overflow groove to flow down along the side wall surfaces of the forming body 5. The forming body 5 is configured to cause the molten glasses GM having flowed down to join each other at lower end portions of the side wall surfaces. Thus, the band-shaped sheet glass GR is formed.

After that, the band-shaped sheet glass GR is subjected to the annealing step S6 with the annealing furnace and the cutting step S7 with the cutting device to be cut into sheet glasses having predetermined dimensions. As a result of the steps described above, a sheet glass being a glass article is completed. Alternatively, a glass roll being a glass article may be obtained by removing both ends of the sheet glass GR in a width direction in the cutting step S7 and thereafter taking up the band-shaped sheet glass GR into a roll shape (take-up step).

With the manufacturing method and the manufacturing device for a glass article according to this embodiment described above, each of the flange portions 9a and 9b of the transfer pipe 7 is supported by the support devices 24a to 24c. Thus, in the pre-heating step S1, the flange portions 9a and 9b being heavy objects act like weights so that expansion (extension) of the main body portion 8 can be prevented from being hindered. Further, the flange portions 9a and 9b are movably supported. Thus, frictional resistance generated when the flange portions 9a and 9b move in the pre-heating step S1 can be reduced as much as possible. Accordingly, in the pre-heating step S1, thermal stress generated in the transfer pipe can be reduced, and the transfer pipe 7 can be expanded sufficiently. Thus, the thermal stress generated in the transfer pipe 7 can be reduced also in the course of manufacture of a glass article (molten glass supply step S4), and deformation or buckling of the transfer pipe 7 caused by the expansion can be prevented, thereby being capable of achieving a long lifetime of the transfer pipe 7.

Figure 7:
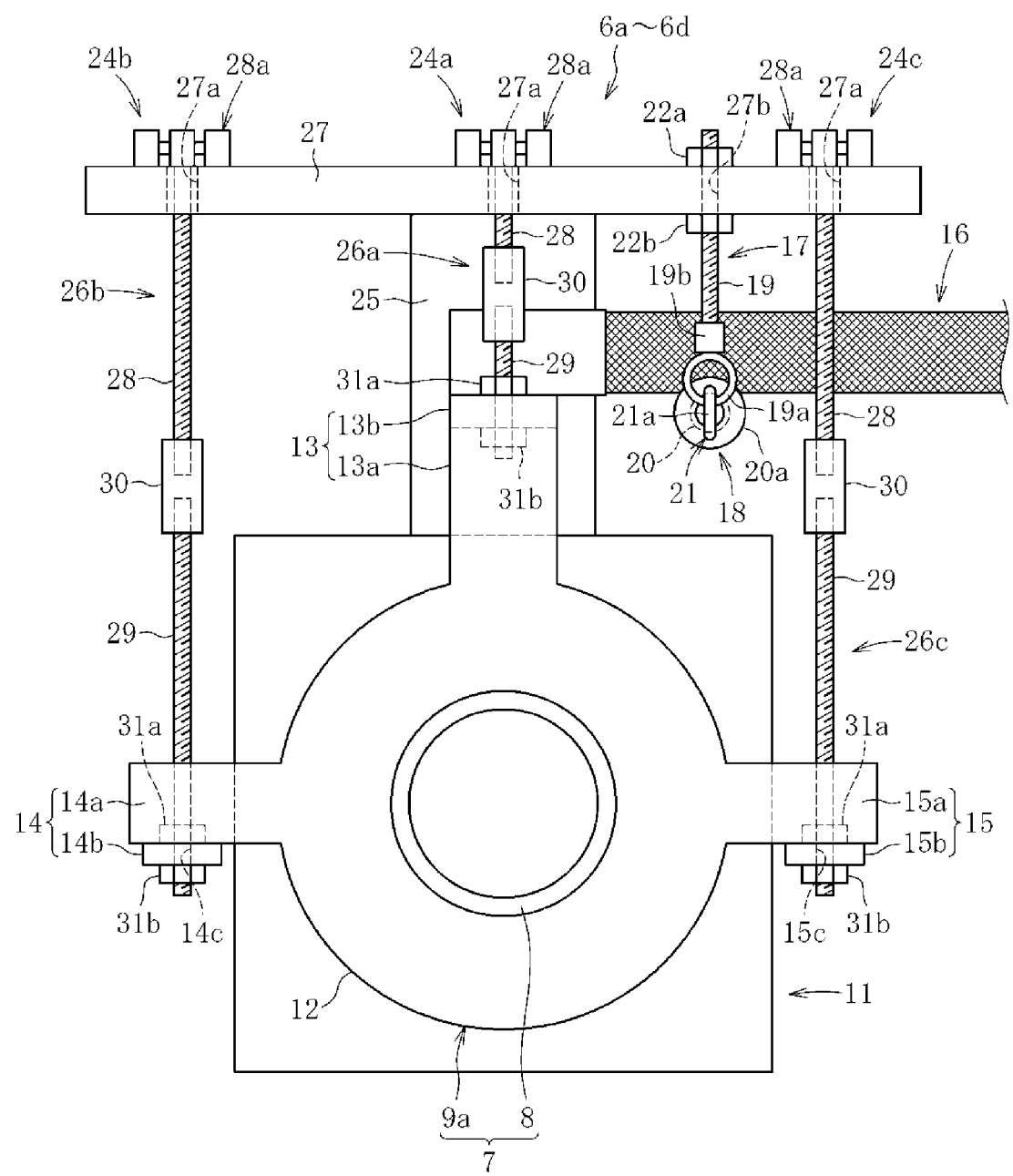
FIG. 7 is a front view of a transfer pipe of a second embodiment.
Figure 8:
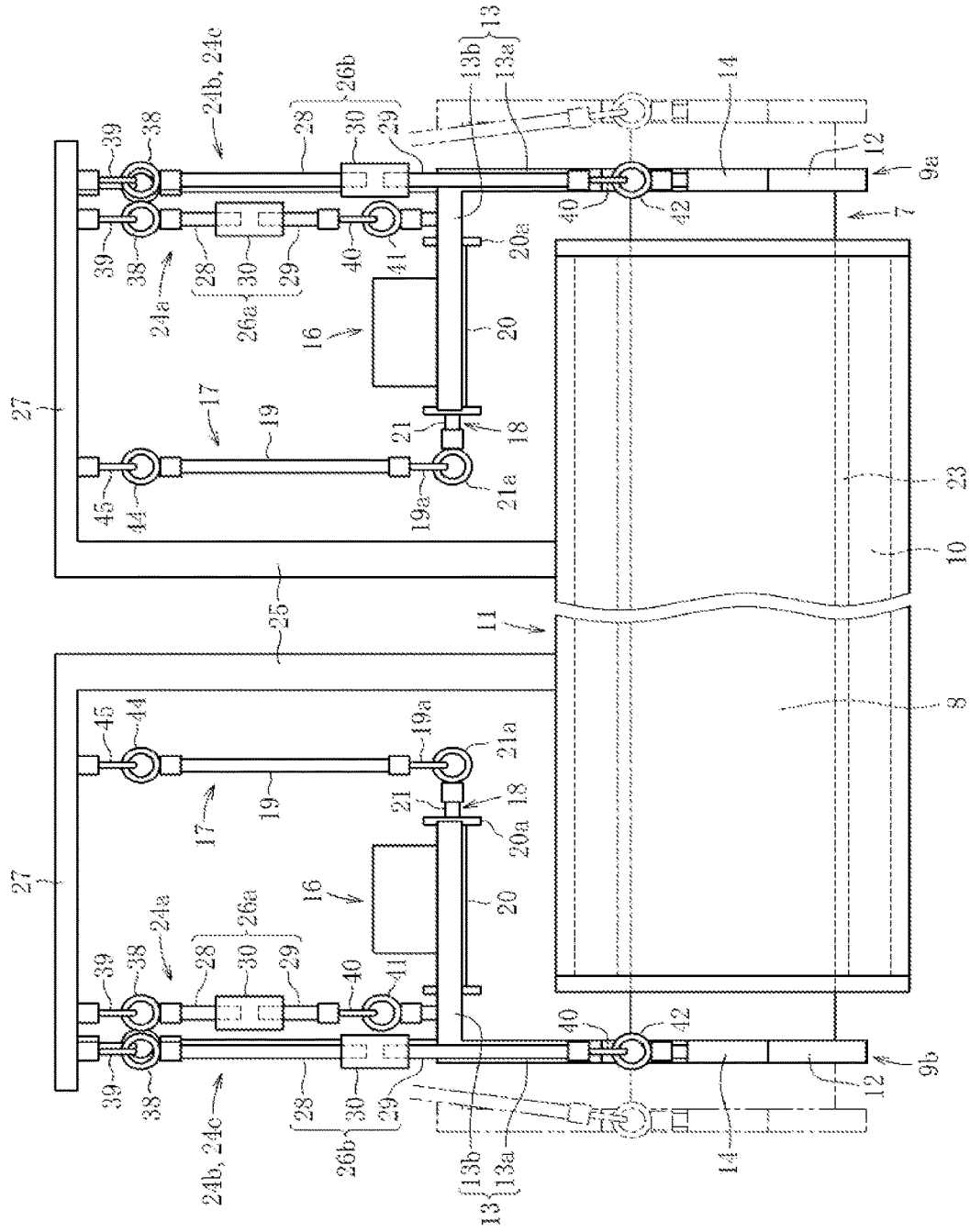
FIG. 8 is a side view of a transfer pipe of a third embodiment.
Figure 9:
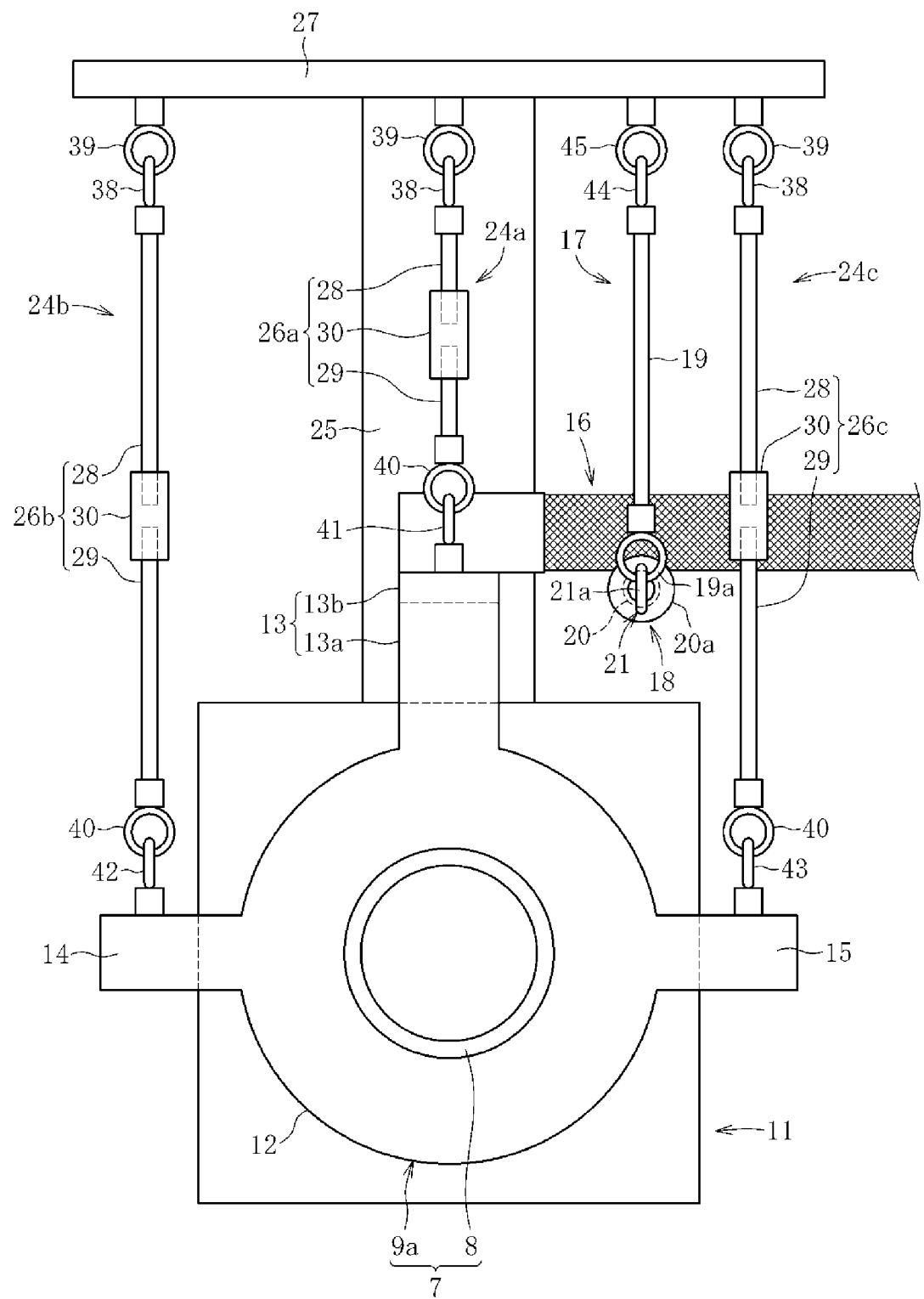
FIG. 9 is a front view of the transfer pipe of FIG. 8.
Figure 10:
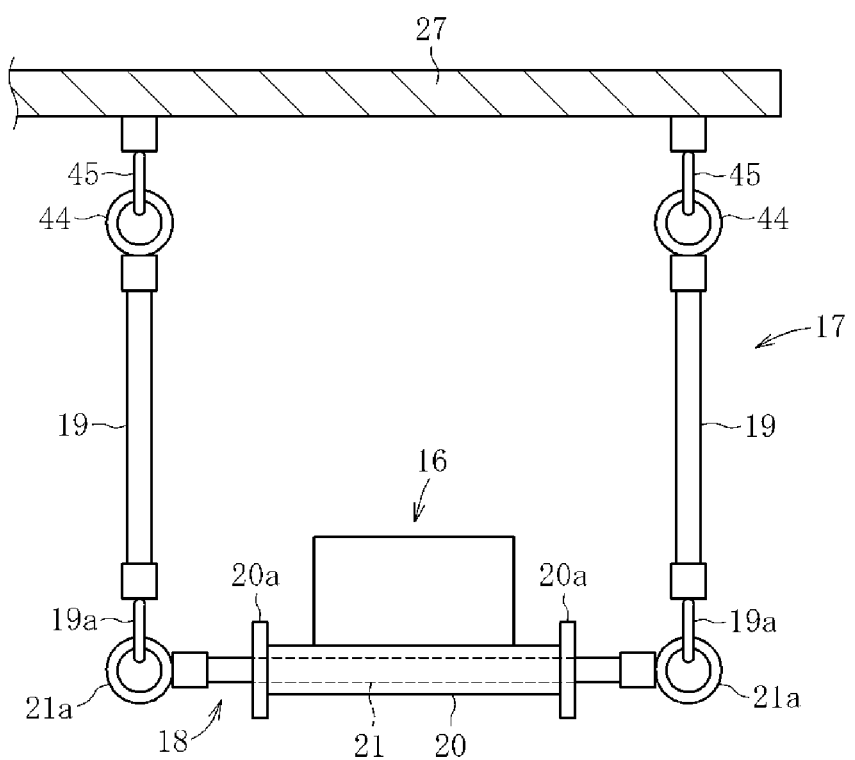
FIG. 10 is a side view for illustrating a supporting structure for the electric wire.
Figure 11:
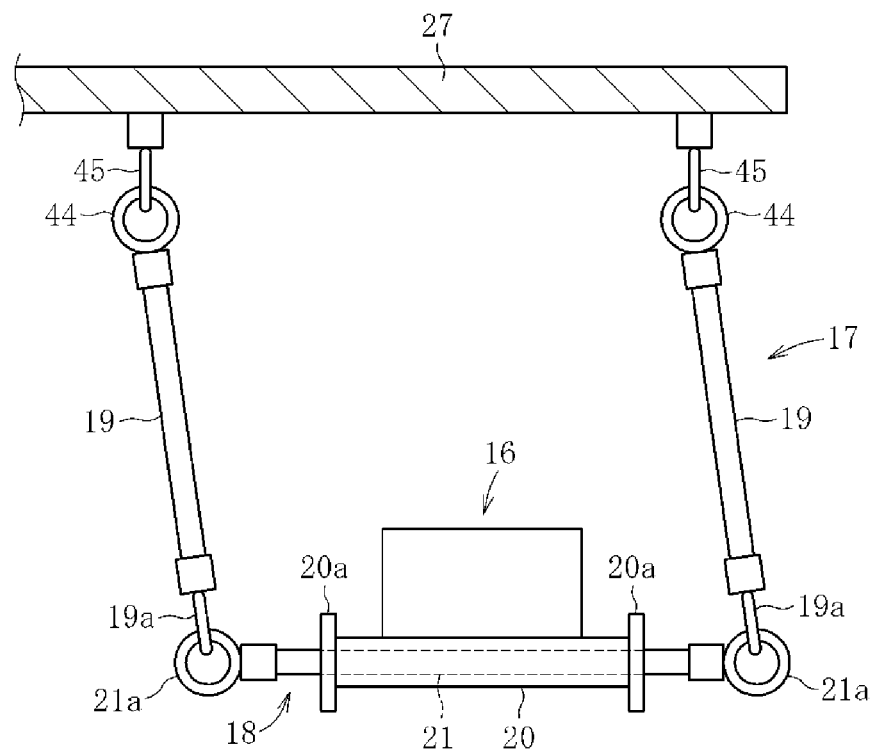
FIG. 11 is a side view for illustrating the supporting structure for the electric wire.

FIG. 7 is an illustration of a transfer pipe of a second embodiment. In this embodiment, the support devices 24a to 24c comprise the common support column 25, and coupling members 26a to 26c configured to connect the support column 25 and the projecting portions 13 to 15 of each of the flange portions 9a and 9b to each other, respectively. In the following, the coupling member 26a of the first support device 24a is referred to as a first coupling member, and the coupling member 26b of the second support device 24b is referred to as a second coupling member. Further, the coupling member 26c of the third support device 24c is referred to as a third coupling member. The first coupling member 26a has the same configuration as that of the coupling member 26 of the first embodiment. Similarly to the first coupling member 26a, the second coupling member 26b and the third coupling member 26c each comprise a first rod 28 comprising a roller 28a, a second rod 29, and an insulating member 30 located between the first rod 28 and the second rod 29.

The support portion 27 of the support column 25 is configured to movably support the coupling members 26a to 26c. The support portion 27 has long holes 27a corresponding to the coupling members 26a to 26c.

The second portion 14b of the second projecting portion 14 has a hole 14c through which the second rod 29 of the second coupling member 26b is inserted. The second portion 15b of the third projecting portion 15 has a hole 15c through which the second rod 29 of the third coupling member 26c is inserted.

The second coupling member 26b is configured to couple the support portion 27 and the second projecting portion 14 to each other in such a manner that the roller 28a of the second coupling member 26b is held in contact with the upper surface of the support portion 27, and the second rod 29 is fixed to the second portion 14b of the second projecting portion 14 with fixing members 31a and 31b such as nuts.

Similarly, the third coupling member 26c is configured to couple the support portion 27 and the third projecting portion 15 to each other in such a manner that the roller 28a of the third coupling member 26c is held in contact with the upper surface of the support portion 27, and the second rod 29 is fixed to the second portion 15b of the third projecting portion 15 with fixing members 31a and 31b such as nuts.

FIG. 8 to FIG. 11 are illustrations of a transfer pipe of the third embodiment. In this embodiment, the support devices 24a to 24c comprise the first coupling member 26a, the second coupling member 26b, and the third coupling member 26c configured to couple each of the flange portions 9a and 9b and the support portion 27, respectively. The coupling members 26a to 26c each have a rod shape as a whole. The coupling members 26a to 26c each comprise the first rod 28 coupled to the support portion 27, the second rod 29 coupled to each of the flange portions 9a and 9b, and the insulating member 30 interposed between the first rod 28 and the second rod 29.

The first rod 28 comprises an annular coupling portion 38 at an upper end portion thereof. The annular coupling portion 38 is coupled to the support portion 27. Similar annular coupling portions 39 are fixed to the support portion 27, and the annular coupling portion 39 and the annular coupling portion 38 of the first rod 28 are swingably coupled to each other. With this, upper ends of the coupling members 26a to 26c are swingably retained by the support portion 27.

The second rod 29 comprises an annular coupling portion 40 at a lower end portion thereof. The annular coupling portion 40 is coupled to each of the projecting portions 13 to 15 of each of the flange portions 9a and 9b. The projecting portions 13 to 15 comprise annular coupling portions 41 to 43 coupled to the annular coupling portions 40 of the second rods 29, respectively. The annular coupling portion 40 of the second rod 29 and each of the annular coupling portions 41 to 43 of the projecting portions 13 to 15 are swingably coupled to each other. With this, lower ends of the coupling members 26a to 26c are swingably coupled to each of the flange portions 9a and 9b.

The insulating member 30 couples the first rod 28 and the second rod 29 to each other under a state in which a lower end portion of the first rod 28 and an upper end portion of the second rod 29 are separated away from each other.

The coupling members 26a to 26c can change a support posture of each of the flange portions 9a and 9b in accordance with expansion of the main body portion 8 when the main body portion 8 expands in the longitudinal direction in the pre-heating step S1 under a state in which the coupling members 26a to 26c support each of the flange portions 9a and 9b of the transfer pipe 7. That is, when the main body portion 8 of the transfer pipe 7 expands from the length indicated by the solid line in FIG. 8 to the length indicated by the two-dot chain lines in FIG. 8, each of the flange portions 9a and 9b moves outward in the axial direction so as to follow the expansion of the main body portion 8. In this case, the coupling members 26a to 26c allow movement of each of the flange portions 9a and 9b in an inclined posture as indicated by the two-dot chain line.

In this embodiment, the configuration of the support member 17 configured to support the electric wire 16 is different from that of the first embodiment. That is, the second support bodies 19 each comprise an annular coupling portion 44 at an upper end portion thereof. The annular coupling portion 44 is swingably coupled to an annular coupling portion 45 provided to the support portion 27. With this, the support member 17 is configured to change postures of the second support bodies 19 so as to allow movement of the electric wire 16 when the electric wire 16 moves along with movement of each of the flange portions 9a and 9b in the pre-heating step S1 (see FIG. 11).

Figure 12:
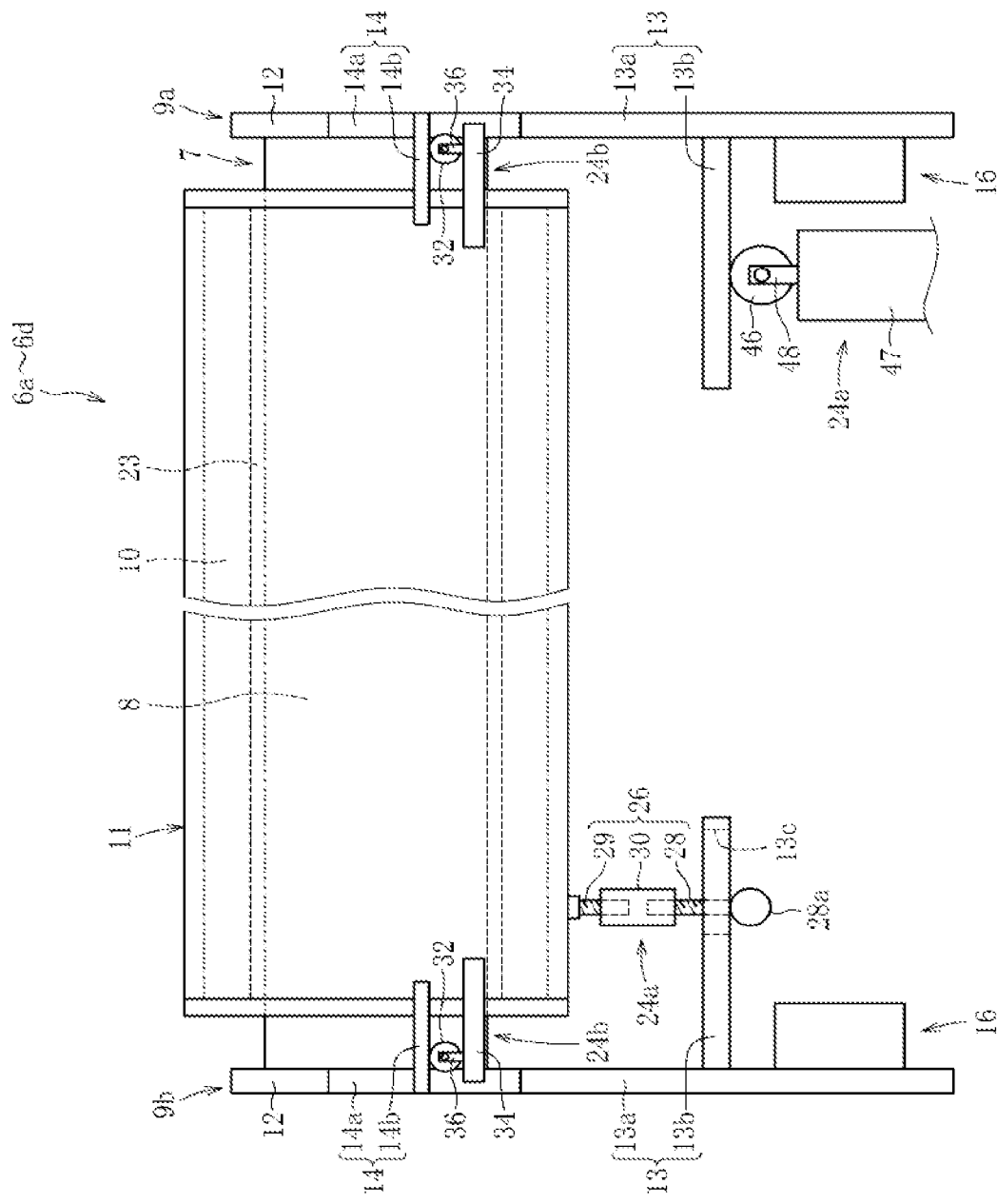
FIG. 12 is a side view of a transfer pipe of a fourth embodiment.

FIG. 12 is an illustration of a transfer pipe of the fourth embodiment. In this embodiment, each of the flange portions 9a and 9b comprises the first portion 13a and the second portion 13b. The first portion 13a projects downward from a lower end portion of the disc portion 12. The second portion 13b projects from the first portion 13a. The second portion 13b is formed into a plate shape and is fixed to a lower end portion of the first portion 13a. The second portion 13b projects in the horizontal direction from a middle portion of the first portion 13a toward the center portion of the main body portion 8 in the longitudinal direction. The second portion 13b is fixed to the first portion 13a in a posture of being parallel to the longitudinal direction of the main body portion 8 of the transfer pipe 7. In the first portion 13a, the electric wire 16 is connected to a portion below the second portion 13b.

The first support device 24a configured to support the flange portion 9a on the right side comprises a roller 46 and a support base 47. The roller 46 is configured to support the first projecting portion 13 of the flange portion 9a. The support base 47 is configured to rotatably support the roller 46. The roller 46 is rotatably supported on the support base 47 through intermediation of a bracket 48. The support base 47 is installed on a floor surface of a factory or the like on which the manufacturing device is arranged.

Similarly to the first support device 24a of the first embodiment, the first support device 24a, which is configured to support the flange portion 9b on the left side, is configured to movably support the flange portion 9b by the coupling member 26. However, unlike the first support device 24a of the first embodiment, an upper end of the coupling member 26 (second rod 29) is fixed to a lower surface of the casing. Further, the second portion 13b of the first projecting portion 13 has a long hole for causing the first rod 28 to insert therethrough, and the roller 28a is held in contact with a lower surface of the second portion 13b.

Figure 13:
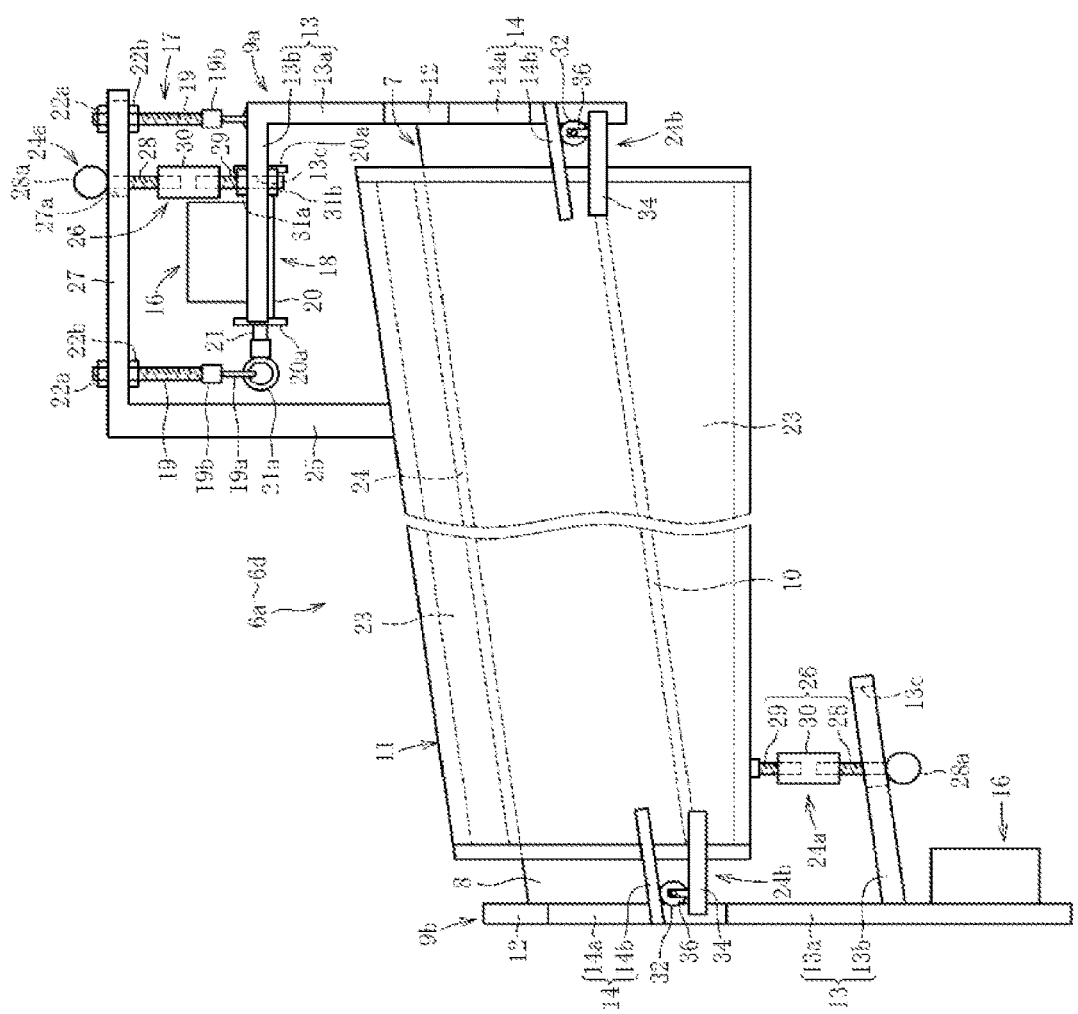
FIG. 13 is a side view of a transfer pipe of a fifth embodiment.

FIG. 13 is an illustration of a transfer pipe of the fifth embodiment. This embodiment is different from the first embodiment in that the transfer pipe 7 is in an inclined posture. The transfer pipe 7 comprises the main body portion 8 and the flange portions 9a and 9b. The main body portion 8 is formed in an inclined posture. The flange portions 9a and 9b are formed on both end portions of the main body portion. The main body portion 8 is inclined so that the end portion on the first flange portion 9a side is located on an upper side with respect to the end portion on the second flange portion 9b side. It is desired that an inclination angle of the main body portion 8 with respect to the horizontal direction be 3° to 30°.

The first projecting portion 13 of the flange portion 9a on the right side comprises the first portion 13a and the second portion 13b. The first portion 13a projects upward from an upper end portion of the disc portion 12. The second portion 13b projects from the first portion 13a toward the center portion of the main body portion 8 in the longitudinal direction. The second portion 13b of this embodiment extends horizontally, but may be inclined at the same angle as the inclination angle of the main body portion 8 so as to be parallel to the main body portion 8 of the transfer pipe 7. The first support device 24a of the flange portion 9a has the same configuration as that of the first embodiment. In this embodiment, the distance from the support portion 27 to the second portion 13b becomes smaller along with movement of the flange portion 9a in accordance with extension of the main body portion 8. Therefore, the length of the coupling member 26 is shortened, and a state in which the flange portion 9a is supported by the coupling member 26 is maintained. The length of the coupling member 26 maybe changed, for example, by changing the fastening length of the first rod 28 and/or the second rod 29 with respect to the insulating member 30.

The first projecting portion 13 of the flange portion 9b on the left side comprises the first portion 13a and the second portion 13b. The first portion 13a projects downward from the lower end portion of the disc portion 12. The second portion 13b projects from the first portion 13a toward the center portion of the main body portion 8 in the longitudinal direction. The second portion 13b of this embodiment is inclined at the same angle as the inclination angle of the main body portion 8 so as to be parallel to the main body portion 8 of the transfer pipe 7, but may extend horizontally. The first support device 24a of the flange portion 9b has the same configuration as that of the fourth embodiment. The first support device 24a supports the second portion 13b of the first projecting portion 13 in a inclined posture, thereby being capable movably supporting the flange portion 9b without hindering expansion of the main body portion 8.

In each of the flange portions 9a and 9b, the second portions 14b and 15b of the second projecting portion 14 and the third projecting portion 15 are inclined at the same angle as the inclination angle of the main body portion 8 so as to be parallel to the main body portion 8 of the transfer pipe 7.

Figure 14:
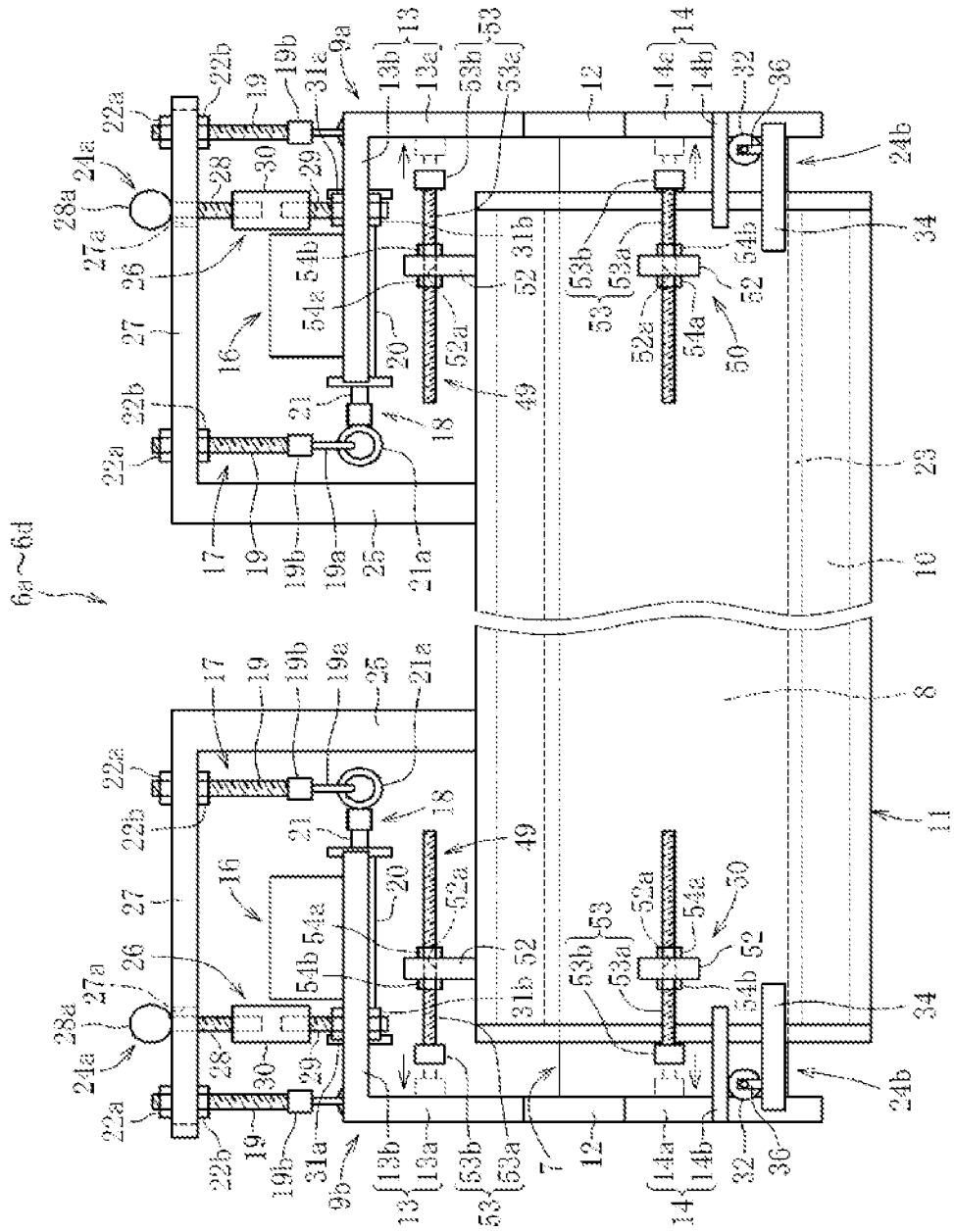
FIG. 14 is a side view of a transfer pipe of a sixth embodiment.
Figure 15:
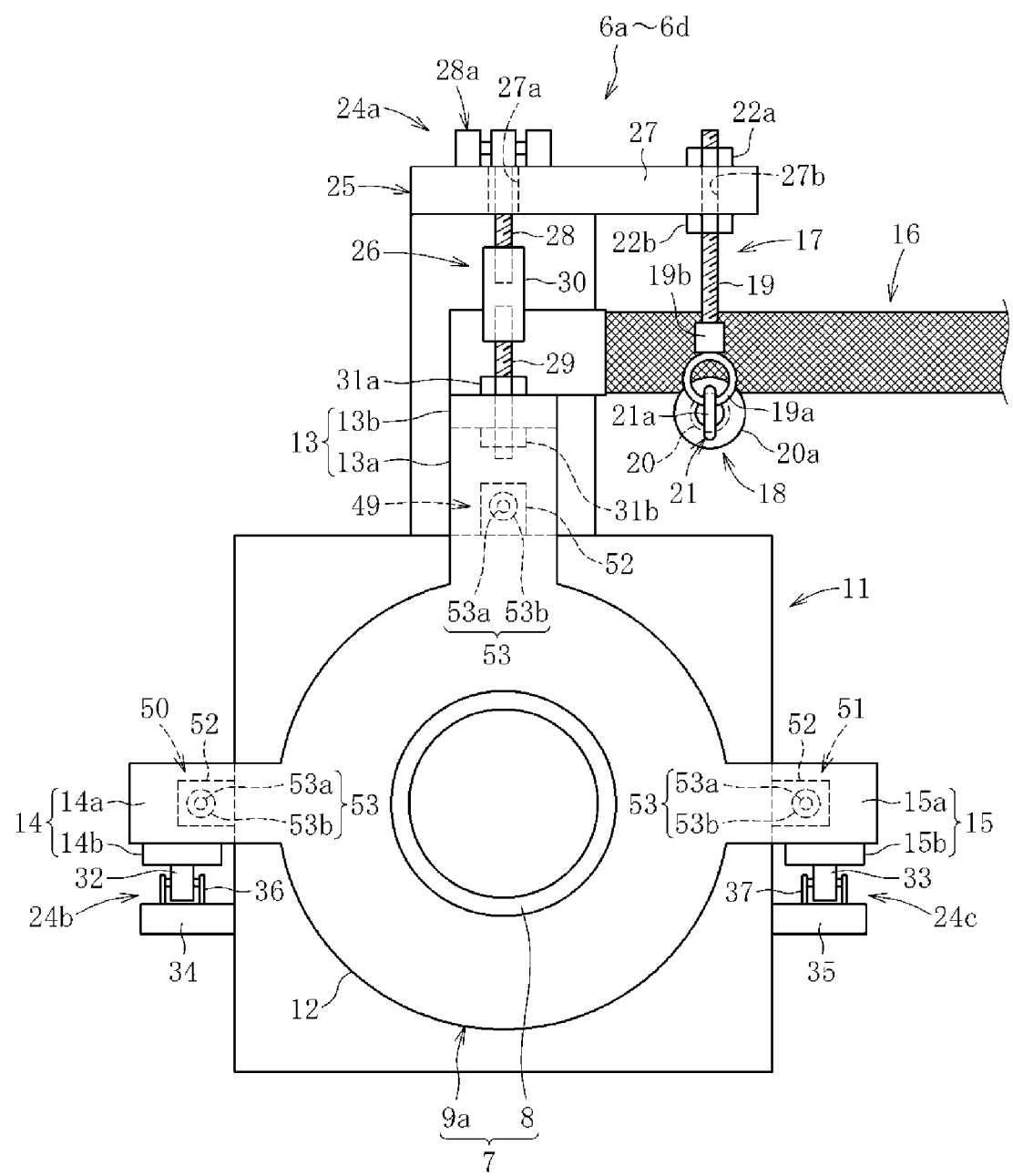
FIG. 15 is a front view of the transfer pipe of FIG. 14.

FIG. 14 and FIG. 15 are illustrations of a transfer pipe of the sixth embodiment. This embodiment is different from the first embodiment in that pressing devices 49 to 51 configured to apply an external force to the transfer pipe 7 are provided to the outer surface of the casing 11.

The pressing devices 49 to 51 are configured to apply an external force to each of the flange portions 9a and 9b of the transfer pipe 7 along the direction in which the transfer pipe 7 extends (longitudinal direction). The pressing devices 49 to 51 are provided at a plurality of positions on the casing 11. That is, the pressing devices 49 to 51 are arranged on an outer surface of the casing 11 at positions corresponding to those of the projecting portions 13 to 15 of the flange portions 9a and 9b. The plurality of pressing devices 49 to 51 comprise first pressing devices 49, second pressing devices 50, and third pressing devices 51. The first pressing devices 49 are provided at upper portions of the casing 11. The second pressing devices 50 and the third pressing device 51 are provided at side portions of the casing 11.

The pressing devices 49 to 51 each comprise a bracket 52 and a pressing member 53. The bracket 52 is provided on an outer surface of the casing 11. The pressing member 53 is supported by the bracket 52. The bracket 52 has a plate shape and comprises a hole 52a passing therethrough along a longitudinal direction of the casing 11 (longitudinal direction of the main body portion 8).

The pressing member 53 comprises a shaft portion 53a and a pressing portion 53b. The pressing portion 53b is fixed at a distal end of the shaft portion 53a. The shaft portion 53a has a male thread portion, and the male thread portion is inserted through the hole 52a of the bracket 52. The shaft portion 53a is fixed to the bracket 52 with fixing members 54a and 54b. The fixing members 54a and 54b are formed of a pair of nuts. The fixing members 54a and 54b are threadedly engaged with the male thread portion of the shaft portion 53a. The fixing members 54a and 54b are fastened so as to sandwich the bracket 52 so that the shaft portion 53a is fixed.

The pressing portion 53b is made of an insulating material and has a disc shape, but the shape of the pressing portion 53b is not limited to the disc shape. The pressing portion 53b is formed so as to approach and separate with respect to the projecting portions 13 to 15 of the flange portions 9a and 9b by a rotary action of the shaft portion 53a.

In the pre-heating step S1, the pressing devices 49 to 51 apply an external force to each of the flange portions 9a and 9b when the expansion length of the main body portion 8 of the transfer pipe 7 is insufficient to promote expansion of the main body portion 8 (external force application step). In the external force application step, the pressing member 53 of each of the pressing devices 49 to 51 is rotated so that the pressing portion 53b at a standby position separated away from each of the flange portions 9a and 9b is brought closer to each of the projecting portions 13 to 15 of each of the flange portions 9a and 9b. With this, the pressing portion 53b is brought into contact with one surface of each of the flange portions 9a and 9b (see the two-dot chain line in FIG. 14). Then, the pressing member 53 is rotated so that the pressing portion 53b presses each of the projecting portions 13 to 15.

With this, an external force is applied to each of the projecting portions 13 to 15, which are provided at a plurality of positions in a circumferential direction of each of the flange portions 9a and 9b, along the direction in which the main body portion 8 extends. The external force is applied not to generate tensile stress in the main body portion 8, but to reduce thermal stress (compression stress) of the main body portion 8 by promoting expansion of the main body portion 8. As described above, the external force is applied to each of the projecting portions 13 to 15 so that the main body portion 8 can be reliably expanded to a desired length in accordance with pre-heating time (heating temperature) without leaving thermal stress in the main body portion 8.

The present invention is not limited to the configurations of the above-mentioned embodiments. In addition, the action and effect of the present invention are not limited to those described above. The present invention may be modified in various forms within the range not departing from the spirit of the present invention.

In the embodiments described above, the transfer pipe 7 forming each of the glass supply passages 6a to 6d is given as an example. However, the transfer pipe 7 is not limited to such use, and the fining bath 2 may be formed of the transfer pipe 7 of the mode described above. That is, the present invention is applicable also to the fining bath 2.

In the embodiments described above, the support devices 24a to 24c comprise the rollers 32, 33, and 46 configured to movably support each of the flange portions 9a and 9b, respectively. However, the present invention is not limited thereto, and a roller may be integrally formed on each of the second portions 13b to 15b of the projecting portions 13 to 15 of each of the flange portions 9a and 9b. In this case, each of the support bases 34, 35, and 47 of the support devices 24a to 24c has a support surface on which the roller is rollable (movable).

In the third embodiment described above, the coupling structures by the annular coupling portions 38 to 45 are illustrated as examples. However, the present invention is not limited thereto and can employ a structure using a hook, a hinge, or other coupling means.

REFERENCE SIGNS LIST 7 transfer pipe
8 main body portion
9a flange portion
9b flange portion
24a first support device
24b second support device
24c third support device
10 refractory
11 casing
28a roller (rolling member)
32 roller (rolling member)
33 roller (rolling member)
46 roller (rolling member)
S1 pre-heating step
S4 glass supply step (transfer step)

The invention claimed is:

1. A manufacturing method for a glass article, the manufacturing method comprising:
   a pre-heating step of heating a transfer pipe without flowing molten glass in the transfer pipe; and
   a transfer step of causing the molten glass to flow through the transfer pipe after the pre-heating step,
   wherein the transfer pipe comprises a main body portion having a tubular shape and a flange portion formed on an end portion of the main body portion,
   wherein the main body portion is retained by a refractory in a horizontal posture or an incline posture, and
   wherein, in the pre-heating step, the main body portion is heated while a weight of the flange portion is supported by a support device that allows movement of the flange portion in a longitudinal direction of the main body portion and the flange portion is moved in the longitudinal direction of the main body portion in accordance with extension of the main body portion.

2. The manufacturing method for a glass article according to claim 1, wherein, in the pre-heating step, an electric wire connected to the transfer pipe is movably supported so that the electric wire is moved in accordance with the extension of the main body portion.

3. The manufacturing method for a glass article according to claim 2,
   wherein the flange portion has an upper portion and a lower portion, and
   wherein, in the pre-heating step, the upper portion of the flange portion is movably supported.

4. The manufacturing method for a glass article according to claim 3,
   wherein the flange portion has an intermediate portion between the upper portion and the lower portion, and wherein, in the pre-heating step, the intermediate portion of the flange portion in an up-and-down direction is movably supported.

5. The manufacturing method for a glass article according to claim 4, wherein, in the pre-heating step, the lower portion of the flange portion is movably supported.

6. The manufacturing method for a glass article according to claim 2,
wherein the flange portion has an upper portion, an intermediate portion, and a lower portion, and
wherein, in the pre-heating step, the intermediate portion of the flange portion in an up-and-down direction is movably supported.

7. The manufacturing method for a glass article according to claim 6, wherein, in the pre-heating step, the lower portion of the flange portion is movably supported.

8. The manufacturing method for a glass article according to claim 2,
wherein the flange portion has an upper portion and a lower portion, and
wherein, in the pre-heating step, the lower portion of the flange portion is movably supported.

9. The manufacturing method for a glass article according to claim 2, wherein, in the pre-heating step, the support member includes a rolling member.

10. The manufacturing method for a glass article according to claim 1,
wherein the flange portion has an upper portion and a lower portion, and
wherein, in the pre-heating step, the upper portion of the flange portion is movably supported.

11. The manufacturing method for a glass article according to claim 10,
wherein the flange portion has an intermediate portion between the upper portion and the lower portion, and
wherein, in the pre-heating step, the intermediate portion of the flange portion in an up-and-down direction is movably supported.

12. The manufacturing method for a glass article according to claim 11, wherein, in the pre-heating step, the lower portion of the flange portion is movably supported.

13. The manufacturing method for a glass article according to claim 10, wherein, in the pre-heating step, the lower portion of the flange portion is movably supported.

14. The manufacturing method for a glass article according to claim 10, wherein, in the pre-heating step, the support device includes a rolling member.

15. The manufacturing method for a glass article according to claim 1,
wherein the flange portion has an upper portion, an intermediate portion, and a lower portion, and
wherein, in the pre-heating step, the intermediate portion of the flange portion in an up-and-down direction is movably supported.

16. The manufacturing method for a glass article according to claim 15, wherein, in the pre-heating step, the lower portion of the flange portion is movably supported.

17. The manufacturing method for a glass article according to claim 1,
wherein the flange portion has an upper portion and a lower portion, and
wherein, in the pre-heating step, the lower portion of the flange portion is movably supported.

18. The manufacturing method for a glass article according to claim 1, wherein, in the pre-heating step, the support device includes a rolling member.

19. The manufacturing method for a glass article according to claim 1, wherein, in the pre-heating step, the support device includes a rod-shaped coupling member having an upper end swingably retained and a lower end swingably coupled to the flange portion.

* * * * *